(12) United States Patent
Smith

(10) Patent No.: US 12,077,028 B2
(45) Date of Patent: Sep. 3, 2024

(54) COILOVER SHOCK WITH ADJUSTABLE CROSSOVER

(71) Applicant: Justin Smith, Wittmann, AZ (US)

(72) Inventor: Justin Smith, Wittmann, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 378 days.

(21) Appl. No.: 17/190,676

(22) Filed: Mar. 3, 2021

(65) Prior Publication Data

US 2021/0276385 A1 Sep. 9, 2021

Related U.S. Application Data

(60) Provisional application No. 62/984,608, filed on Mar. 3, 2020.

(51) Int. Cl.
*B60G 15/06* (2006.01)
*B60G 17/027* (2006.01)

(52) U.S. Cl.
CPC ....... *B60G 15/065* (2013.01); *B60G 17/0272* (2013.01); *B60G 2202/312* (2013.01); *B60G 2204/1242* (2013.01); *B60G 2204/43* (2013.01); *B60G 2500/22* (2013.01)

(58) Field of Classification Search
CPC .............. B60G 15/065; B60G 17/0272; B60G 2500/22; B60G 2202/312; B60G 2204/43; B60G 2204/1242
See application file for complete search history.

(56) References Cited

U.S. PATENT DOCUMENTS

| | | | | |
|---|---|---|---|---|
| 4,733,918 A | * | 3/1988 | Farr | B60G 17/0272 |
| | | | | 303/22.8 |
| 4,830,395 A | * | 5/1989 | Foley | B60G 17/0272 |
| | | | | 280/124.162 |
| 5,263,695 A | * | 11/1993 | Bianchi | B60G 7/04 |
| | | | | 267/225 |
| 6,676,119 B2 | * | 1/2004 | Becker | B60G 17/0272 |
| | | | | 267/218 |
| 9,821,621 B2 | * | 11/2017 | Mason | B60G 11/14 |
| 9,869,360 B2 | * | 1/2018 | Smith | F16B 37/0892 |

(Continued)

FOREIGN PATENT DOCUMENTS

GB 2590027 A * 6/2021 ........... B60G 15/062

*Primary Examiner* — Vishal R Sahni
(74) *Attorney, Agent, or Firm* — Schmeiser, Olsen & Watts LLP

(57) ABSTRACT

A coilover shock with adjustable crossover is disclosed, in which, in some embodiments, a pre-load collar of a coilover shock may be adjustable in length, so as to engage the spring divider, when the tender coil spring is partially compressed during a compression stroke of the coilover shock, to prevent further compression of the tender coil spring and begin compression of the main coil spring. In some embodiments, the spring divider may be adjustable in length, so as to engage the pre-load collar, when the tender coil spring is partially compressed during a compression stoke of the coilover shock, to prevent further compression of the tender coil spring and begin compression of the main coil spring. In some embodiments, an adjustable pre-load collar, or an adjustable spring divider, may be controlled remotely, such as by a controller located in the driver compartment of the vehicle.

7 Claims, 3 Drawing Sheets

(56) References Cited

U.S. PATENT DOCUMENTS

| | | | | |
|---|---|---|---|---|
| 2002/0038929 | A1* | 4/2002 | Now | B60G 17/021 |
| | | | | 267/217 |
| 2011/0210525 | A1* | 9/2011 | Michel | B60G 15/065 |
| | | | | 280/5.5 |
| 2012/0286462 | A1* | 11/2012 | Pepka | F16F 3/04 |
| | | | | 267/177 |
| 2013/0200589 | A1* | 8/2013 | Cox | B60G 17/0272 |
| | | | | 267/218 |
| 2017/0253102 | A1* | 9/2017 | Mason | B60G 17/0272 |
| 2017/0369098 | A1* | 12/2017 | Urbanski | B62D 7/228 |
| 2019/0248440 | A1* | 8/2019 | Winefordner | B62K 25/04 |
| 2020/0001677 | A1* | 1/2020 | Blankson | B60G 15/065 |
| 2020/0361267 | A1* | 11/2020 | Ricketts | B60G 15/063 |
| 2020/0377168 | A1* | 12/2020 | Kubotera | B62K 25/283 |
| 2021/0276385 | A1* | 9/2021 | Smith | B60G 15/065 |
| 2021/0300139 | A1* | 9/2021 | D'Orazio | B60G 15/065 |
| 2022/0001714 | A1* | 1/2022 | Blankson | B60G 15/065 |
| 2022/0041029 | A1* | 2/2022 | Randall | F16F 9/10 |

* cited by examiner

COILOVER SHOCK WITH ADJUSTABLE CROSSOVER

CROSS REFERENCE TO RELATED APPLICATION[S]

This application claims priority to U.S. Provisional Patent Application entitled "Coilover Shock with Adjustable Crossover," Ser. No. 62/984,608, filed Mar. 3, 2020, the disclosure of which is hereby incorporated entirely herein by reference.

BACKGROUND OF THE INVENTION

Technical Field

This invention relates generally to coilover shocks for vehicles, and more particularly to a coilover shock with adjustable crossover.

State of the Art

A common type of shock used today is a coil spring over shock, or as typically referred to, a "coilover shock" or simply a "coilover". A coilover comprises a piston damper cylinder encircled by a coil spring. The coil spring may be contained between a coil spring retaining ring, or perch, coupled to the piston rod, upon which the lower end of the coil spring rests, and a pre-load collar, coupled to the cylinder, at the upper end of the coil spring. The pre-load collar may be threaded onto a threaded cylinder of the piston damper and act to retain the coil spring in a partially-compressed, or pre-loaded state. The position of the pre-load collar on the threaded cylinder determines the amount of pre-load compression of the coil spring.

Some coilovers have more than one coil spring, each coil spring having a different spring stiffness. For example, a dual coilover comprises an upper coil spring, or tender spring, and a lower coil spring, or main coil spring, separated by a spring divider, wherein the main coil spring is typically stiffer than the tender spring. As such, during a first phase of compression, the tender spring, having a lower stiffness, compresses first, then in a second phase of compression, the main coil spring, having a higher stiffness, compresses. This allows passengers in the vehicle to feel comfortable during easy driving conditions, or over small bumps, wherein the tender spring with a lower stiffness is utilized, and under extreme driving conditions, or over larger bumps, the main coil spring with a higher stiffness is utilized after the tender spring fully compresses.

Many dual coilovers further comprise a crossover ring coupled to, or threaded onto, the cylinder of the piston damper at a location within the tender spring coils between the pre-load collar and the spring divider. As the tender spring is compressed, the crossover ring moves closer to the spring divider until it engages the spring divider, at which point the tender spring can no longer be compressed, and the main coil spring then begins to compress. This prevents the tender spring from binding, which would cause it to wear out faster, and, more importantly, causes the main coil spring to begin compression earlier in the compression stroke. "Crossover" refers to the point at which compression switches from the tender spring to the main coil spring. The location of the crossover ring on the cylinder determines the amount of compression of the tender spring before compression switches to the main coil spring, and therefore affects the response of the coilover shock, including timing of crossover during compression, under various driving conditions.

Adjusting the location of the crossover ring higher or lower on the piston cylinder changes the timing of crossover during a compression stroke. However, adjusting the location can be a cumbersome process. Accordingly, what is needed is a coilover shock with more easily-adjustable crossover.

SUMMARY OF THE INVENTION

The present invention relates to coilover shocks for vehicles, and more particularly to a coilover shock with adjustable crossover.

Disclosed is a coilover shock with adjustable crossover. Crossover is the point at which compression of a dual coilover shock transitions from the tender coil spring to the main coil spring. In some embodiments, the pre-load collar may be adjustable in length, so as to engage the spring divider, when the tender coil spring is partially compressed during a compression stroke of the coilover shock, to prevent further compression of the tender coil spring and begin compression of the main coil spring. In some embodiments, the spring divider may be adjustable in length, so as to engage the pre-load collar, when the tender coil spring is partially compressed during a compression stoke of the coilover shock, to prevent further compression of the tender coil spring and begin compression of the main coil spring.

In embodiments, either, or both, of a pre-load collar and a spring divider may comprise two components that are threaded together, wherein the overall length thereof may be adjusted by rotating one component relative to the other. In other embodiments, either, or both, of a pre-load collar and a spring divider may comprise two components coupled together by at least one actuator, such as a screw-type actuator, a hydraulic actuator, or by a variable-force solenoid actuator, or the like, whether telescoping or not, for example. In such embodiments, the at least one actuator is coupled between the two components to move one with respect to the other, to adjust the overall length.

In some embodiments, the at least one actuator of an adjustable pre-load collar, or an adjustable spring divider, as described above, may be controlled remotely, such as by a controller located in the driver compartment of the vehicle. In such embodiments, the crossover, of a dual-spring coilover shock, may be adjustable by a user engaging the controller, without having to exit the vehicle.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the present invention relate to coilover shocks for vehicles, and more particularly to a coilover shock with adjustable crossover.

Figure 1:
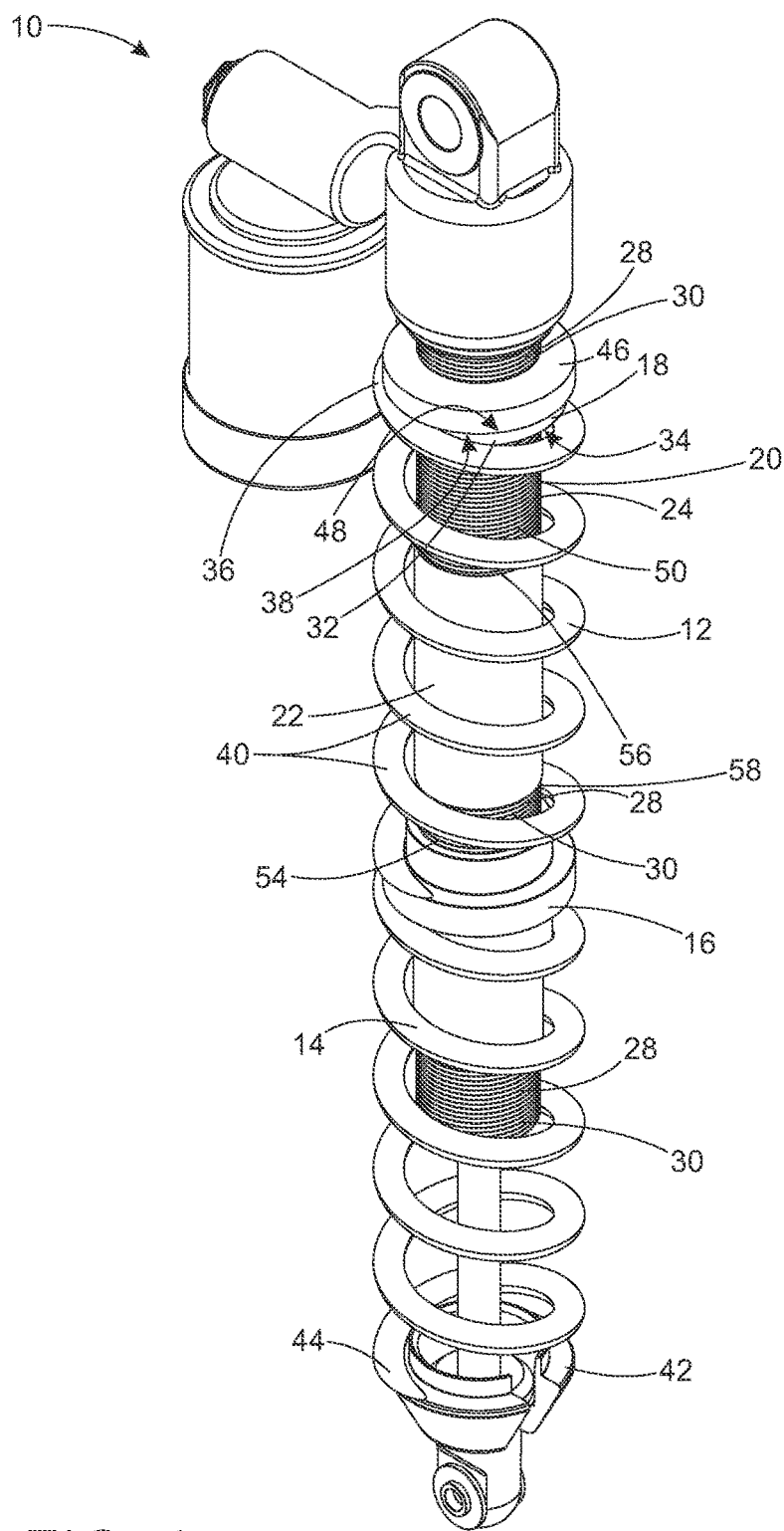
FIG. 1 is a perspective view of a coilover shock with adjustable crossover according to an embodiment.

Referring to the drawings, FIG. 1 illustrates a coilover shock 10 with adjustable crossover, according to an embodiment. Crossover is the point at which compression of a dual coilover shock 10 transitions from the tender coil spring 12 to the main coil spring 14. It is desirable for crossover to occur, during compression of a dual coilover shock 10, when the tender spring 12 is only partially compressed, and before the tender spring 12 is fully compressed. Fully compressing the tender spring 12, or binding the spring 12, tends to wear out the spring 12 prematurely. A coilover shock 10 with adjustable crossover, of the present invention, does not use a crossover ring. Instead, the pre-load collar 18 or the spring divider 16 is adjustable in length. In some embodiments, the pre-load collar 18 may be adjustable in length, so as to engage the spring divider 16, when the tender coil spring 12 is partially compressed during a compression stroke of the coilover shock 10, to prevent further compression of the tender coil spring 12 and begin compression of the main coil spring 14. In some embodiments, the spring divider 16 may be adjustable in length, so as to engage the pre-load collar 18, when the tender coil spring 12 is partially compressed during a compression stoke of the coilover shock 10, to prevent further compression of the tender coil spring 12 and begin compression of the main coil spring 14.

Figure 2:
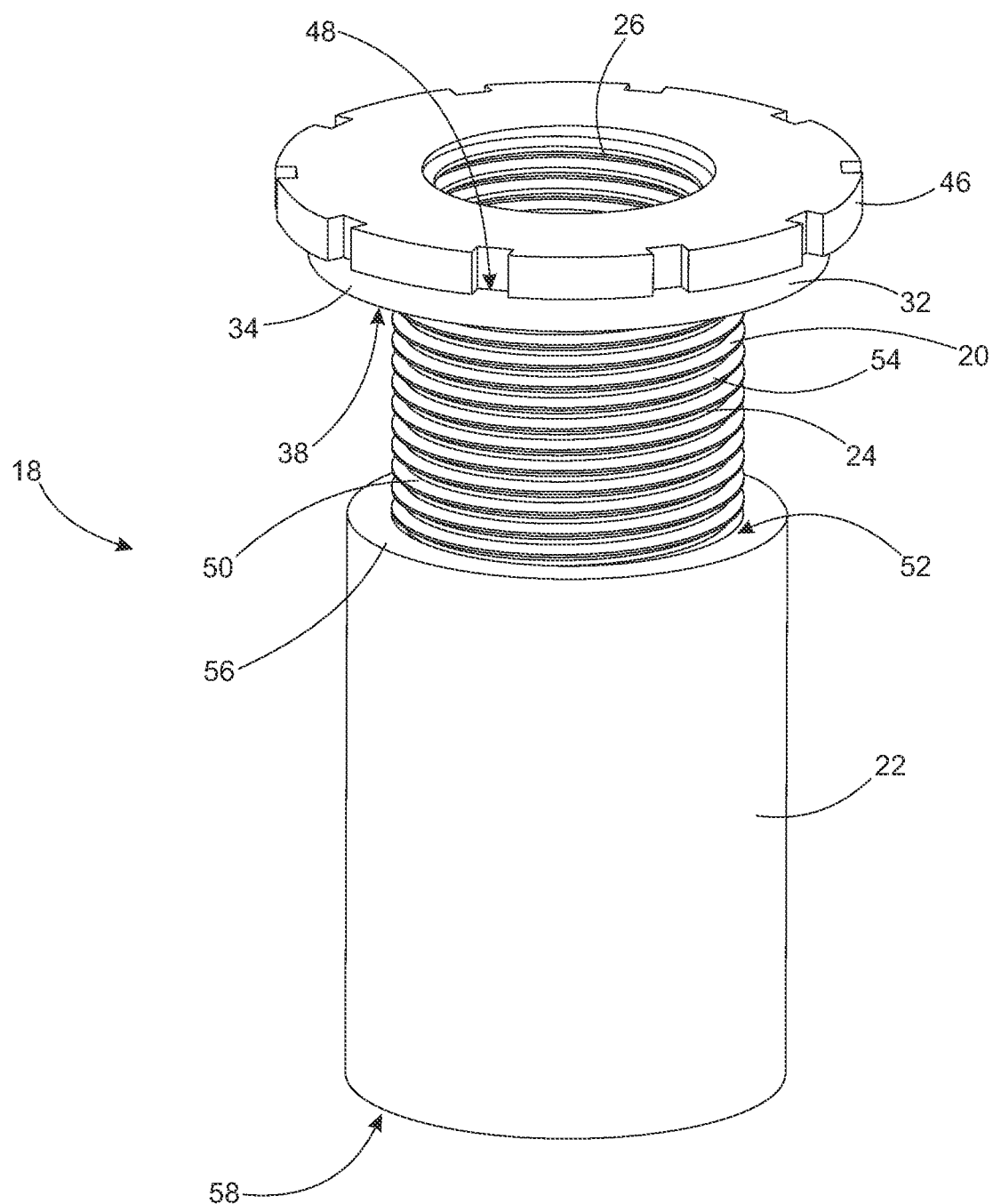
FIG. 2 is a perspective view of an adjustable pre-load collar of a coilover shock with adjustable crossover according to an embodiment.
Figure 3:
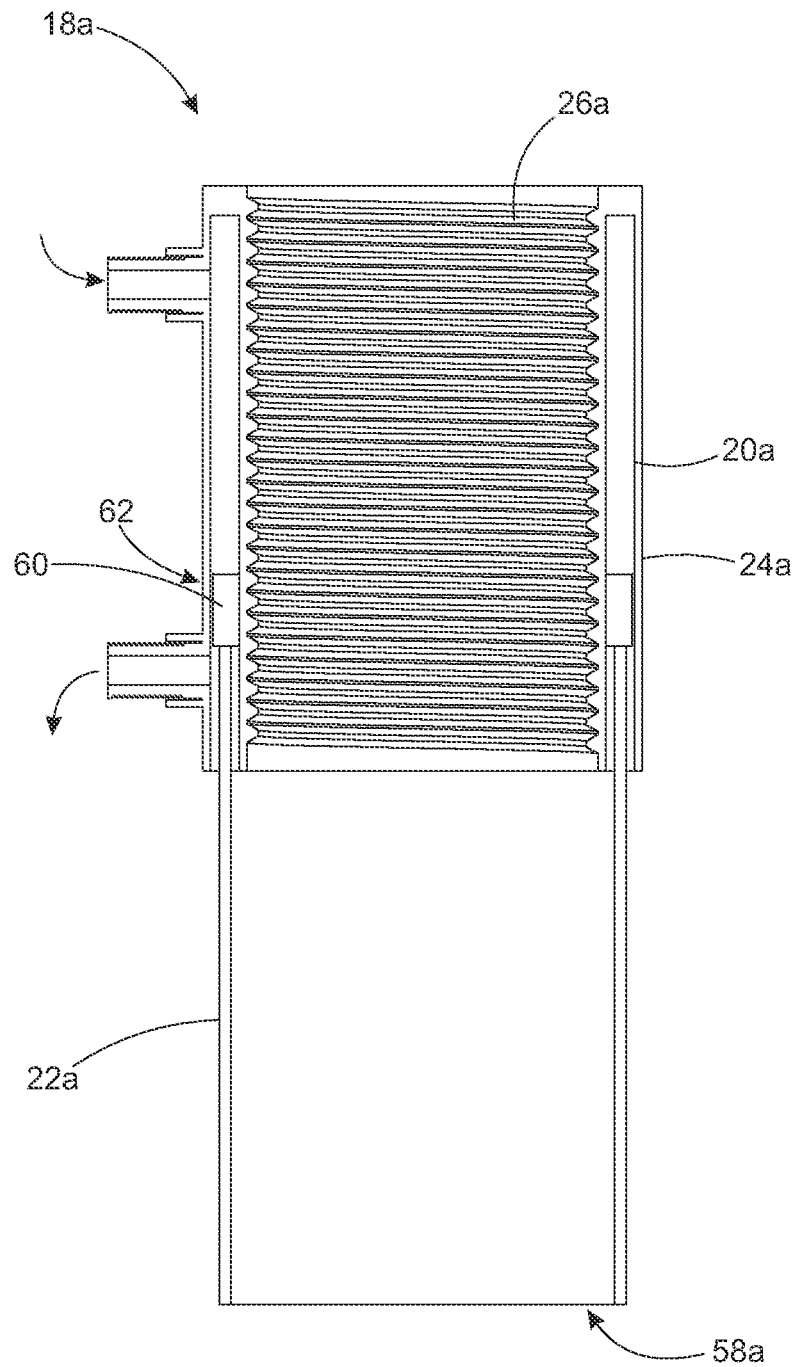
FIG. 3 is a perspective view of an adjustable pre-load collar of a coilover shock with adjustable crossover according to an alternative embodiment.

In some embodiments, as shown in FIGS. 1-3, the pre-load collar 18 may be adjustable in length. For example, in some embodiments, as an adjustable pre-load collar 18 comprises an inner member 20 and an outer member 22. As shown in FIGS. 1 and 2, the inner member 20 may comprise an elongate tubular body 24 having inner threads 26 for engaging threads 28 of a threaded piston damper cylinder 30 of a coilover shock 10. As shown, the inner member 20 further comprises a tender spring seat 32 extending radially outward about a circumference of the inner member 20 at a top end 34 thereof for engaging the top end 36 of a tender spring 12. The lower surface 38 of the tender spring seat 32 may further comprise a lip or a recess (not shown) around the outer edge thereof for receiving the top end 36 of the tender spring 12. The remainder of the elongate tubular body 24 of the inner member 20 has a diameter less than the inner diameter of the tender spring coils 40, thereby allowing the elongate tubular body 24 to extend into the tender spring coils 40 until the tender spring seat 32 engages the top end 36 of the tender spring 12. The position of the inner member 20 on the threaded piston damper cylinder 30 may be adjusted up or down, relative to the cylinder 30, by rotating the inner member 20 to thread it up or down along the cylinder 30 to the desired position. The position of the inner member 20 on the cylinder 30 determines the amount of preload and, therefore, the stiffness of the tender coil spring 12 and the main coil spring 14. The tender coil spring 12 and the main coil spring 14 are contained between the tender spring seat 32 of the pre-load collar 18 at the top end 36 of the tender spring 12 and the perch 42 at the lower end 44 of the main coil spring 14, a spring divider 16 being coupled between the tender spring 12 and the main coil spring 14. In some embodiments, a jamb nut 46 may be threaded onto the cylinder 30 and tightened until it engages the upper surface 48 of the inner member 20 to lock it into position by friction between the jamb nut 46 and the inner member 20.

As shown in more detail in FIG. 2, the outer surface 50 of the elongate tubular body 24 of the inner member 20 may also be threaded for receiving an outer member 22, wherein the outer member 22 is of elongate tubular shape, having inner threads 52 corresponding to the outer threads 54 of the inner member 20. The outer member 22 also has an outer diameter less than the inner diameter of the tender spring coils 40, thereby allowing the outer member 22 to pass through the tender spring coils 40 without contacting the tender spring coils 40.

The outer member 22 may be threaded completely onto the inner member 20 until the upper end 56 of the outer member 22 engages the tender spring seat 32, thereby defining the shortest adjustable length of the pre-load collar 18. To extend the length of the pre-load collar 18, the outer member 22 is simply rotated in the reverse direction and partially unthreaded from the inner member 20 until the pre-load collar 18 is of the desired length.

As the coilover shock 10 is compressed, in a first phase of compression, the tender spring 12 is compressed, until the lower end 58 of the outer member 22 engages the spring divider 16. At that point, the tender spring 12 is prevented from compressing further, and the main coil spring 14 begins to compress in a second phase of compression. The crossover point between compression of the tender spring 12 and compression of the main coil spring 14 is adjustable by adjusting the length of the adjustable pre-load collar 18 by threading the outer member 22 more or less on the inner member 20. The outer member 22 should be of sufficient length to prevent the tender spring 12 from binding when the outer member 22 is threaded completely onto the inner member 20 such that the adjustable pre-load collar 18 is at its shortest length. This is determined by the length of the tender spring 12 when fully-compressed.

In some embodiments, the inner and outer members 20 and 22 are not threaded together. Instead, they are coupled together by at least one actuator 60, as shown in FIG. 3, such as a screw-type actuator, a hydraulic actuator 62, or by a variable-force solenoid actuator, or the like, whether telescoping or not, for example. The exemplary embodiment shown in FIG. 3 has a hydraulic actuator 62. In such embodiments, the at least one actuator 60 is coupled between an upper member 20a and a lower member 22a and acts to move the upper member 20a up or down with the threaded piston damper cylinder 30 within the tender spring 12, relative to the lower member 22a, to lengthen or shorten an adjustable pre-load collar 18a. The adjustable pre-load collar 18a is provided with a tubular body 24a having an inner threaded portion 26a for threadingly engaging the threaded piston damper cylinder 30. Thus, when the actuator 60 is full-extended, the adjustable pre-load collar 18a is at its greatest length, and the tender spring 12 is compressed very little, if at all, during compression of the shock 10, before the lower end 58a of the lower member 22a engages the spring divider 16 and compression of the main coil spring 14 begins. When the actuator 60 is partially or fully retracted, crossover occurs later in the compression stroke, because the tender spring 12 is allowed to more fully compress before the lower end 58a of the lower member 22a engages the spring divider 16 and compression of the main coil spring 14 begins.

The embodiments described above, in which the pre-load collar 18 is adjustable in length are not intended to be limiting. It is to be understood that a pre-load collar 18 may be extended in length in any of a variety of ways, so long at the pre-load collar 18 is extendable in length such that a bottom portion 58 thereof engages the spring divider 16 during compression of the shock 10 to transition compression of the tender spring 12 to the main coil spring 14, and the crossover point is adjustable by lengthening or shortening the pre-load collar 18.

In some embodiments, it is the spring divider 16, and not the pre-load collar 18 that is adjustable. In some such embodiments, the spring divider 16 may comprise inner and outer members (not shown) that are threaded together in the same manner as the threaded inner and outer members 20 and 22 of an adjustable pre-load collar 18 described above, except that the outer member of an adjustable spring divider 16 extends upward through the coils 40 of the tender spring 12 from the inner member of the adjustable spring divider 16. During compression of the coilover shock 10, the inner member of the adjustable spring divider 16 moves closer to the pre-load collar 18 until it engages the pre-load collar 18, thereby ending compression of the tender spring 12 and initiating compression of the main coil spring 14. Crossover may be adjusted by rotating the outer member of the adjustable spring divider 16 relative to the inner member of the spring divider 16, to adjust the length of the adjustable spring divider 16.

In other such embodiments, the length of the spring divider 16 may be adjusted by an actuator, such as a screw-type actuator, a hydraulic actuator, or by a variable-force solenoid actuator, or the like, whether telescoping or not, for example, coupled between the inner and outer members of the adjustable spring divider 16, in a similar manner to adjustment of the length of an adjustable length pre-load collar 18, as described above. Thus, when the actuator is fully-extended, the adjustable spring divider 16 is at its greatest length, and the tender spring 12 is compressed very little, if at all, during compression of the shock 10, before the upper end of the outer member of the adjustable spring divider 16 engages the pre-load collar 18 and compression of the main coil spring 14 begins. When the actuator is partially or fully retracted, crossover occurs later in the compression stroke, because the tender spring 12 is allowed to more fully compress before the upper end of the outer member of the adjustable spring divider 16 engages the pre-load collar 18 and compression of the main coil spring begins 14.

In some embodiments, the at least one actuator of an adjustable pre-load collar 18, or an adjustable spring divider 16, as described above, may be controlled remotely, such as by a controller (not shown) located in the driver compartment of the vehicle, for example. The controller may be coupled to the actuator, whether wired, or wirelessly, to control extension and retraction of the actuator. In such embodiments, the crossover, of a dual-spring coilover shock 10, may be adjustable by a user engaging the controller, without having to exit the vehicle. In such embodiments, crossover may be adjusted while the vehicle is in use.

The embodiments described above, in which the spring divider 16 is adjustable in length are not intended to be limiting. It is to be understood that a spring divider 16 may be extended in length in any of a variety of ways, so long at the spring divider 16 is extendable in length such that a top portion thereof engages the pre-load collar 18 during compression of the shock 10 to transition compression of the tender spring 12 to the main coil spring 14, and the crossover point is adjustable by lengthening or shortening the spring divider 16.

It is also understood that, in some embodiments, either the pre-load collar 18 or the spring divider 16, or both the pre-load collar 18 and the spring divider 16, may be adjustable in length.

Although the teachings herein above are applied to a dual coilover shock 10, this is not intended to be limiting. The teachings may be applied to a coilover shock 10 having more than two coil springs, such as a triple rate coilover shock, for example, having three coil springs separated by two spring dividers 16. In the case of a triple rate coilover shock, either, or both, of the spring dividers 16 may be adjustable in length to engage the other spring divider 16 to adjust crossover between the second and third coil spring.

The components defining any coilover shock 10 with adjustable crossover may be formed of any of many different types of materials or combinations thereof that can readily be formed into shaped objects provided that the components selected are consistent with the intended operation of a coilover shock 10 with adjustable crossover. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any coilover shock 10 with adjustable crossover may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g., a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A coilover shock having an adjustable crossover comprising:
 a threaded piston damper cylinder with a piston rod extending therefrom, wherein the threaded piston damper cylinder is coupled to a frame of a vehicle and an end of the piston rod is coupled to a control arm of the vehicle;
 a pre-load collar having an inner member having an inner member top end and an outer member, wherein the inner member is adjustable relative to the outer member and wherein the inner member is provided with inner threads to receive the threaded piston damper cylinder at the inner member top end;
 a jamb nut, wherein the jamb nut is threaded onto the threaded piston damper cylinder and engages an upper surface of the inner member, thereby locking the inner member into position by friction between the jamb nut and the inner member;
 a tender spring having a top end, the tender spring receiving said pre-load collar therein; and
 a spring divider supporting said tender spring and received within a main coil spring, wherein the inner member of the pre-load collar engages the top end of the tender spring to adjust stiffness of the tender spring, wherein the inner and outer members have an elongated tubular shape, said inner member having outer threads for threadingly receiving said outer member and said outer member having inner threads corresponding to the outer threads of the inner member, and wherein both the inner and outer members are rotatably adjustable relative to each other via a threaded engagement in order to adjust an overall length of the adjustable pre-load collar.

2. The coilover shock of claim 1, wherein said inner member further comprises a tender spring seat extending radially outward about a circumference of the inner member at the inner member top end thereof for engaging the top end of the tender spring.

3. The coilover shock of claim 1, wherein a bottom end of the tender spring engages the spring divider, wherein the main coil spring engages the spring divider below the tender spring and the spring divider, and wherein a tender spring seat of the pre-load collar receives the top end of the tender spring.

4. A method of adjusting a crossover of a coilover shock comprising:
 compressing the coilover shock to transition from a tender coil spring to a main coil spring, said coilover shock comprising a threaded piston damper cylinder with a piston rod extending therefrom, wherein the threaded piston damper cylinder is coupled to a frame of a vehicle and an end of the piston rod is coupled to a control arm of the vehicle, a pre-load collar, the tender coil spring receiving said pre-load collar therein and a spring divider supporting said tender coil spring and received within the main coil spring, wherein a pre-load collar inner member comprises an elongated tubular body having inner threads matingly engaging the threaded piston damper cylinder of said coilover shock, wherein a jamb nut is threaded onto the threaded piston damper cylinder and engages an upper surface of the pre-load collar inner member, thereby locking the pre-load collar inner member into position by friction between the jamb nut and the pre-load collar inner member; and
 adjusting the crossover by rotating a pre-load collar outer member having inner threads relative to the pre-load collar inner member having outer threads, to adjust an overall length of the pre-load collar, wherein the pre-load collar outer member is threaded onto the pre-load collar inner member, wherein both the inner and outer members are rotatably adjustable relative to each other via a threaded engagement in order to adjust the overall length of the pre-load collar.

5. The method of claim 4, wherein the coilover shock is a dual coilover shock.

6. The method of claim 4, wherein said inner member further comprises a tender spring seat extending radially outward about a circumference of the inner member at an inner member top end thereof for engaging a tender spring top end.

7. The method of claim 4, wherein a bottom end of the tender coil spring engages the spring divider, wherein the main coil spring engages the spring divider below the tender coil spring and the spring divider, and wherein a tender spring seat of the pre-load collar receives a top end of the tender coil spring.

* * * * *